United States Patent Office 2,989,041
Patented June 20, 1961

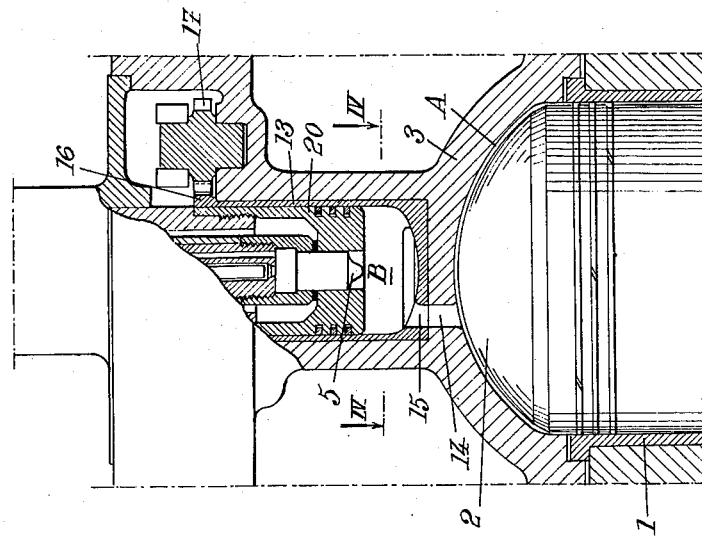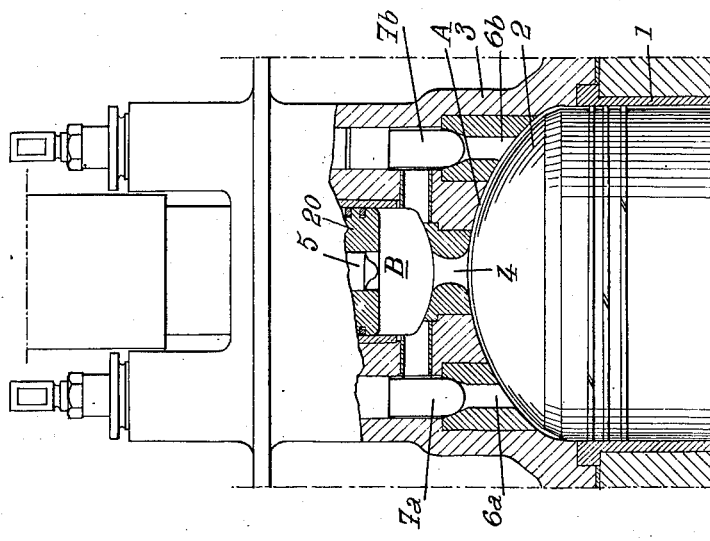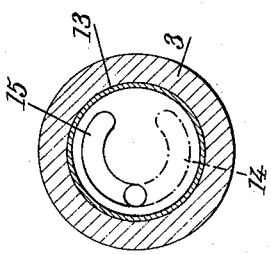

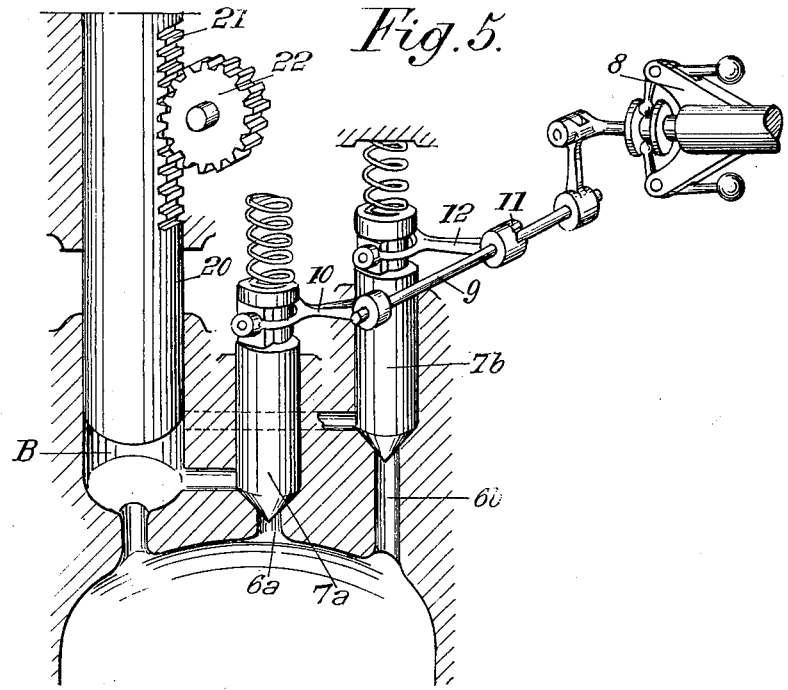
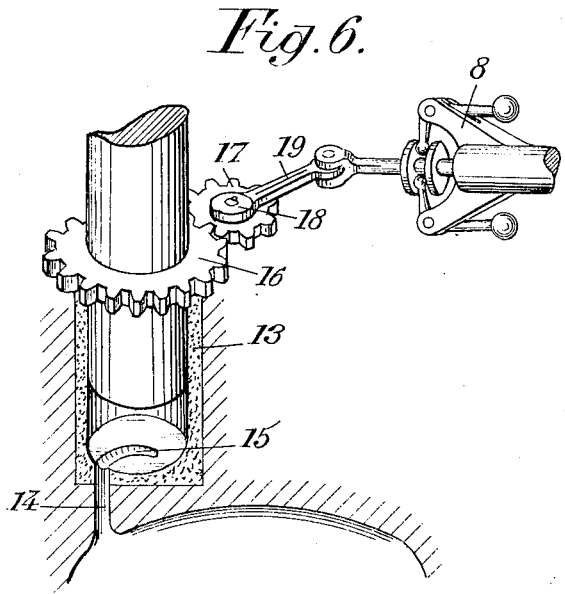

2,989,041
INTERNAL COMBUSTION ENGINES OF THE RECIPROCATING PISTON TYPE
Raymond Emile Georges, 67 Ave. Foch, Paris, France
Filed June 23, 1959, Ser. No. 822,322
Claims priority, application France June 26, 1958
1 Claim. (Cl. 123—32)

The present invention relates to internal combustion engines of the reciprocating piston type (and especially constant pressure cycle, for instance diesel cycle, engines) including, for every engine cylinder, a main combustion chamber in permanent communication, through a passage which will be hereinafter called "transfer passage," with an auxiliary combustion chamber to which fuel is delivered directly by at least one injection device.

The object of my invention is to provide an engine of this kind which is better adapted to meet the requirements of practice than those known up to the present time.

According to this invention, I provide, between said main combustion chamber and said auxiliary combustion chamber, at least one supplementary transfer passage (possibly constituted by an enlargement of the main transfer passage) the cross-sectional area of which is controlled by at least one throttling means operative in response to variations of at least one factor of operation of the engine, said factor being advantageously the speed at which the engine is running.

Other features of this invention will become apparent in the following detailed description of some embodiments thereof, with reference to the appended drawings given merely by way of example and in which:

FIGS. 2 and 3 are similar views corresponding to modifications.

FIG. 4 is a transverse sectional view on the line IV—IV of FIG. 3.

FIGS. 5 and 6 show, in perspective view, the essential elements of two regulation devices for use in engines such as illustrated by FIGS. 2 and 3 respectively.

Figure 1:
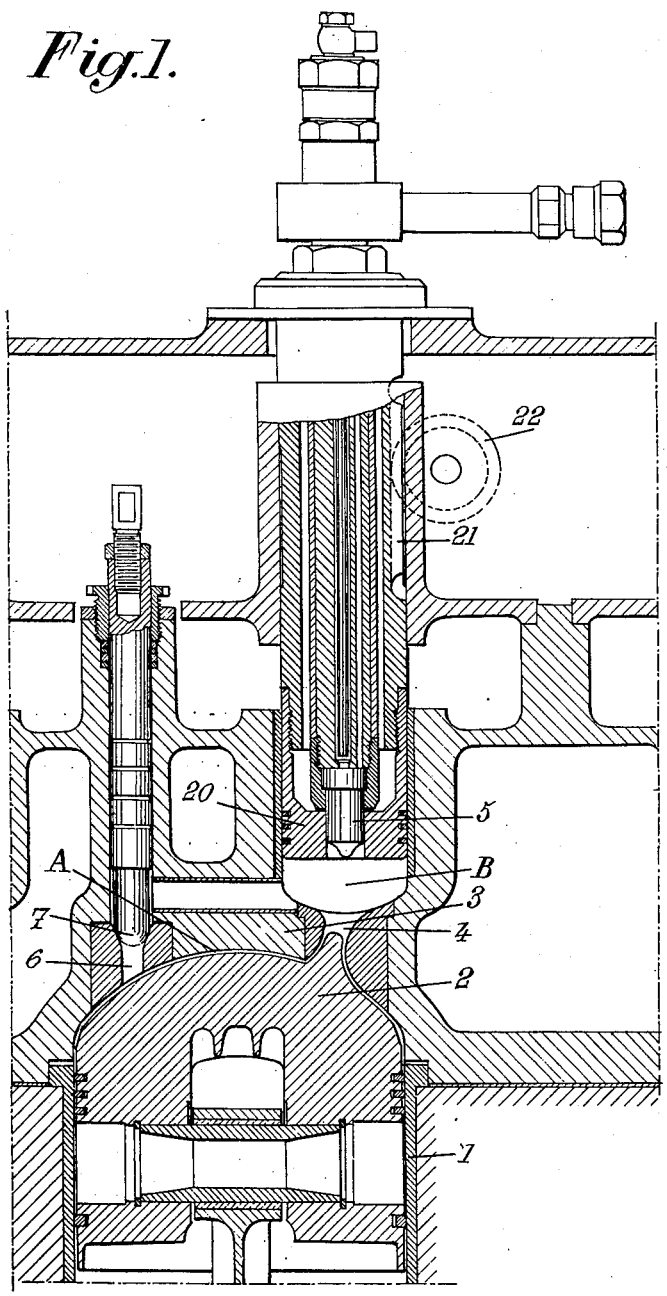
FIG. 1 is an axial sectional view of an internal combustion engine made according to the present invention.

An engine according to my invention includes, in known manner and as shown by FIG. 1, on the one hand a cylinder 1 in which reciprocates a piston 2 the upper end of which limits, together with the wall of a cylinder head 3, a main combustion chamber A; and on the other hand, an auxiliary combustion chamber B provided in said cylinder head 3 and in permanent communication with the main combustion chamber A through a transfer passage 4 preferably having a throttled neck portion, fuel being fed to said auxiliary chamber B, for instance by means of a conventional injector 5.

The masses and dimensions of the moving parts of this engine are arranged in such manner that it is of a light weight type and can work with a high speed of the piston and with a high number of revolutions per minute, in opposition to conventional diesel engines including heavy moving parts and in which the speed of the piston and the number of revolutions per minute are relatively low.

Taking these characteristics into account and in order to limit the fatigue of the relatively light moving parts of this engine, especially during the expansion stroke, it is necessary to limit the cross-sectional area of the transfer passage 4 in such manner that piston 2 is not subjected to a pressure as high as that existing, at the beginning of combustion, in auxiliary chamber B.

Thus, the cross-sectional area of transfer passage 4 is relatively small to enable the pressure in the main chamber A to become equal to that in auxiliary chamber B before the end of the expansion stroke only for speeds lower than a critical speed above which the time of transfer becomes too short to enable the respective pressures in said chambers A and B to become equal to each other before the end of the expansion stroke. As a consequence of this, at high speeds of the engine (that is to say at speeds above this critical value), there is a substantial drop of the power and of the efficiency of the engine.

In other words, the use of a transfer passage 4 having a restricted cross-sectional area and permanently open constitutes a solution which avoids too high a fatigue of some of the moving parts of the engine at low and medium speeds of said engine, but does not permit of obtaining the maximum power and efficiency at high speeds, for which a transfer passage of larger cross-sectional area could be used without risk of overloading said movable parts in view of the very short time of transfer between the two chambers on every cycle.

The main object of the present invention is to obviate this drawback.

For this purpose, I provide, between the main combustion chamber A and auxiliary combustion chamber B, in addition to transfer passage 4, at least one supplementary transfer passage 6 the cross-sectional area of which is controlled by throttling means 7 operated by a regulation device responsive to variations of the value of one factor of operation of the engine.

Preferably, this factor of operation is the speed at which the engine is running and said regulation device is arranged in such manner as to ensure a gradual opening of throttling means 7 for values of the engine speed above the critical value above mentioned.

Thus, at low and medium speeds (lower than the critical speed), I obtain a reduced total cross-sectional area of the transfer passage (only the main transfer passage 4 being in operation) adapted to these speeds, whereas above the critical speed I have a total cross-sectional area (constituted by the whole of the main transfer passage 4 and of the supplementary transfer passage 6) which gradually increases so that at high speeds of the engine there is obtained at the end of the expansion stroke an equal value of the pressure in chambers B and A.

In the embodiment of my invention illustrated by FIG. 1, there is a single supplementary transfer passage 6 controlled by a throttling device 7, for instance of the needle valve type, controlled in such manner by a centrifugal governor (not shown on FIG. 1) that said throttling device is more and more opened as the speed of the engine, having passed above the critical value, increases more and more, said throttling device 7 being on the contrary gradually closed when the speed of the engine, initially higher than said critical value, becomes gradually lower than said critical value.

According to a second embodiment illustrated by FIG. 2, and in a more diagrammatic manner by FIG. 5, two supplementary transfer passages 6a and 6b are provided, said passages being respectively controlled by two throttling devices 7a and 7b. These two throttling devices are controlled by a centrifugal governor 8 through means arranged in such manner as to produce first, when the speed of the engine becomes greater than the critical value, the opening of throttling device 7a, then when the speed further increases above another given value, the opening of throttling device 7b.

The means interposed between centrifugal governor 8 and throttling devices 7a and 7b are made as follows, as shown by FIG. 5:

A control spindle 9, operatively connected with governor 8 so as to be rotated about its axis by said governor, carries, fixed thereon, on the one hand a lever 10 adapted to act on throttling device 7a for speeds of the engine above a critical value, and on the other hand a radially extending projection 11. This projection 11 is movable angularly in a notch provided in the end of a lever 12, journalled on said spindle 9. This notch extends over a portion of the circumference of the part of lever 12 that surrounds spindle 9. For speeds exceeding the above mentioned critical value, when throttling device 7a is lifted, projection 11 moves in the above mentioned notch and does not move lever 12. Then for a given value of the engine speed, projection 11 comes into contact with the end of the notch and rotates lever 12, which lifts throttling device 7b.

According to a third embodiment of the invention illustrated by FIGS. 3, 4 and 6, a transfer passage of adjustable cross-sectional area is used, the supplementary cross-sectional area that is gradually brought into play for speeds of the engine exceeding a critical value acting as equivalent of the above described supplementary transfer passage.

For this purpose I provide, in cylinder head 3 and in the bottom end of a cylindrical casing 13 rotatable in the auxiliary combustion chamber B, two passages or slots in the form of circular arcs 14 and 15 capable of overlapping each other more or less according to the angular position of casing 13.

The position of said casing 13 is controlled by a centrifugal governor 8 (FIG. 6) in such manner that, for speeds below the critical value, the area of overlapping of passages 14 and 15 remains substantially constant and corresponds to the cross-sectional area suitable for the main passage 4 of the above described embodiments. On the other hand, for speeds above said critical value, said overlapping area gradually increases in such manner as to form the equivalent of a supplementary transfer passage. This result is obtained for instance by mounting on the outside of casing 13 a toothed wheel 16 cooperating with a pinion 17 rotated by an angular abutment 18 journalled about the axis of said pinion 17 and controlled by a lever 19 operatively connected with centrifugal governor 8.

According to another feature of the present invention which is advantageously used in combination with the above described feature, means are provided for modifying the volume of the auxiliary combustion chamber B in order to adapt it to the use of different fuels. Such means are for instance constituted, as shown by FIGS. 1 and 5, by a piston 20 slidable in auxiliary chamber B and carrying a rack 21 which cooperates with a control pinion 22 adapted to be manually actuated.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

An internal combustion engine which comprises, in combination, a cylinder, a piston fitting slidably in said cylinder for reciprocating movement therein, a cylinder head limiting, together with said piston at the end of every inward stroke thereof in said cylinder, a main combustion chamber, means forming an auxiliary combustion chamber, means for injecting fuel into said auxiliary chamber, a passage permanently connecting said auxiliary combustion chamber with said main combustion chamber, two other passages, extending from said auxiliary combustion chamber to said main combustion chamber, means for variably throttling each of said second mentioned passages respectively, and tachometric means operative by said engine for controlling said throttling means in accordance with the speed at which said engine is running, said tachometric means being arranged to open one of said two second mentioned passages when the engine speed exceeds a given value and the other of said two second mentioned passages when the engine speed exceeds another given value, higher than the first one.

References Cited in the file of this patent

UNITED STATES PATENTS

| 1,619,825 | Lucke | Mar. 8, 1927 |
| 2,045,858 | Jung | June 30, 1936 |
| 2,198,979 | Schwaiger | Apr. 30, 1940 |

FOREIGN PATENTS

| 769,579 | France | June 11, 1934 |
| 444,460 | Great Britain | Mar. 20, 1936 |
| 700,327 | Germany | Dec. 18, 1940 |